(12) United States Patent
Miyazaki et al.

(10) Patent No.: US 9,140,826 B2
(45) Date of Patent: Sep. 22, 2015

(54) PLASTIC LENS AND LENS BARREL

(71) Applicant: Panasonic Corporation, Osaka (JP)

(72) Inventors: Kyoichi Miyazaki, Osaka (JP); Yukio Hibino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/178,736

(22) Filed: Feb. 12, 2014

(65) Prior Publication Data

US 2014/0160571 A1 Jun. 12, 2014

Related U.S. Application Data

(63) Continuation of application No. PCT/JP2012/005104, filed on Aug. 10, 2012.

(30) Foreign Application Priority Data

Aug. 25, 2011 (JP) ................................. 2011-184166

(51) Int. Cl.
*G02B 1/11* (2015.01)
*G02B 3/00* (2006.01)
*G02B 7/02* (2006.01)
*G02B 27/00* (2006.01)

(52) U.S. Cl.
CPC .. *G02B 1/11* (2013.01); *G02B 3/00* (2013.01); *G02B 7/02* (2013.01); *G02B 27/0018* (2013.01); *G02B 7/021* (2013.01); *G02B 7/022* (2013.01)

(58) Field of Classification Search
CPC .. G02B 2003/0093; G02B 5/003; G02B 9/02; G02B 1/11; G02B 7/022; G02B 7/021
USPC .................................. 359/738–740, 614, 819
See application file for complete search history.

(56) References Cited

U.S. PATENT DOCUMENTS

| 6,072,634 | A  | * | 6/2000 | Broome et al. | ............... | 359/637 |
| 6,239,922 | B1 | * | 5/2001 | Nakamura | .................... | 359/739 |
| 6,285,515 | B1 |   | 9/2001 | Kitazawa et al. | | |
| 7,184,223 | B2 | * | 2/2007 | Sato | ............................. | 359/738 |
| 2008/0117292 | A1 | | 5/2008 | Orihara et al. | | |
| 2009/0225157 | A1 | | 9/2009 | Orihara et al. | | |

FOREIGN PATENT DOCUMENTS

JP 55-157711 12/1980
JP 55-167207 12/1980
(Continued)

OTHER PUBLICATIONS

International Search Report issued Nov. 6, 2012 in International (PCT) Application No. PCT/JP2012/005104.

*Primary Examiner* — Zachary Wilkes
(74) *Attorney, Agent, or Firm* — Wenderoth, Lind & Ponack, L.L.P.

(57) ABSTRACT

A plastic lens, comprising: a first edge section having a first outer circumferential edge surface formed substantially parallel to an optical axis of the plastic lens; and a second edge section having a second outer circumferential edge surface formed so as to have a step with respect to the first outer circumferential edge surface, wherein the first outer circumferential edge surface is not coated with a black coating material that suppresses internal reflection of light, and at least a portion of the second outer circumferential edge surface is coated with the black coating material that suppresses internal reflection of light.

5 Claims, 3 Drawing Sheets

(56) References Cited

FOREIGN PATENT DOCUMENTS

| | | |
|---|---|---|
| JP | 11-326604 | 11/1999 |
| JP | 11-337707 | 12/1999 |
| JP | 2008-129133 | 6/2008 |
| JP | 2009-210996 | 9/2009 |
| JP | 2011-156870 | 8/2011 |
| WO | 2008/053692 | 5/2008 |

* cited by examiner

PLASTIC LENS AND LENS BARREL

CROSS-REFERENCE TO RELATED APPLICATION

This application is a Continuation of International Application No. PCT/JP2012/005104, filed on Aug. 10, 2012, which in turn claims the benefit of Japanese Application No. 2011-184166, filed on Aug. 25, 2011, the disclosures of which Applications are incorporated by reference herein.

BACKGROUND

1. Field

The present disclosure relates to plastic lenses and lens barrels.

2. Description of the Related Art

When a light beam is incident on an imaging optical system composed of a plurality of lenses, such as a zoom lens system or a single focal length lens system, a portion of the incident light is reflected at an inner surface of an outer circumferential part of each lens. Therefore, the reflected light, which is undesired light, might be cast into the range of an aperture for photographing. If such undesired light reaches an imaging surface, noise such as flare or ghost occurs, and thereby image characteristics are deteriorated.

In order to suppress occurrence of such undesired light that causes noise such as flare or ghost, various kinds of lenses each having an outer circumferential part subjected to black coating have conventionally been proposed.

Japanese Laid-Open Patent Publication No. 11-337707 discloses a lens in which a cut plane as an edge plane of an outer peripheral part is entirely coated with a black non-transmitting coating serving as means for preventing reflection of a harmful light beam.

Japanese Laid-Open Patent Publication No. 2008-129133 discloses an image forming lens for use in an image pickup module, in which a portion of an outer peripheral part of a flange, on which a taper is formed, is coated with an adhesive agent containing a black coating material.

Japanese Patent Publication No. 61-043688 discloses a reflection objective lens having an annular part entirely coated with a black coating material.

Japanese Laid-Open Patent Publication No. 11-326604 discloses a lens in which a taper is formed on a side surface, and each rough surface on an incident surface side where the taper is formed is entirely black coated.

Further, as a lens constituting the imaging optical system, a lightweight and relatively inexpensive plastic lens has been widely used. Also in the case of using such a plastic lens, occurrence of undesired light that causes noise such as flare or ghost needs to be suppressed.

In the case of a lens made of a glass material, a coating material for coloring the lens in black is usually less viscous, and therefore, can be relatively easily applied to a target surface. Accordingly, uneven coating, such as excess/shortage of a coating range or an uneven thickness of a coating layer, is less likely to occur, decentering error is not increased so much, and dimensional accuracy of the lens diameter is not lowered so much.

However, in the case of a plastic lens, a coating material for coloring the plastic lens in black is usually highly viscous, and particularly the thickness of a coating layer is likely to be increased more than necessary, which might cause uneven coating. Accordingly, in order to suppress an increase in decentering error and maintain the dimensional accuracy of the lens diameter, a target surface to be coated should be limited to a portion of a side surface of the lens. Further, if such a highly viscous coating material is applied to a portion of the side surface where a taper is formed, the thickness of the coating layer becomes uneven and the coating range is excessively increased. Accordingly, it is very difficult to suppress an increase in decentering error, and maintain the dimensional accuracy of the lens diameter.

SUMMARY

The present disclosure provides a plastic lens which has excellent optical performance due to less decentering error, maintains excellent dimensional accuracy of the lens diameter, and suppresses occurrence of noise such as flare or ghost. Further, the present disclosure provides a lens barrel including the plastic lens.

The novel concepts disclosed herein were achieved in order to solve the foregoing problems in the related art, and herein is disclosed:

a plastic lens, comprising:

a first edge section having a first outer circumferential edge surface formed substantially parallel to an optical axis of the plastic lens; and a second edge section having a second outer circumferential edge surface formed so as to have a step with respect to the first outer circumferential edge surface, wherein the first outer circumferential edge surface is not coated with a black coating material that suppresses internal reflection of light, and at least a portion of the second outer circumferential edge surface is coated with the black coating material that suppresses internal reflection of light.

The novel concepts disclosed herein were achieved in order to solve the foregoing problems in the related art, and herein is disclosed:

a lens barrel, comprising:

a plastic lens; and a holding section that holds at least the plastic lens, wherein the plastic lens comprises:

a first edge section having a first outer circumferential edge surface formed substantially parallel to an optical axis of the plastic lens; and a second edge section having a second outer circumferential edge surface formed so as to have a step with respect to the first outer circumferential edge surface, in which the first outer circumferential edge surface is not coated with a black coating material that suppresses internal reflection of light, and at least a portion of the second outer circumferential edge surface is coated with the black coating material that suppresses internal reflection of light, and wherein the plastic lens is held by the holding section at the first edge section.

The plastic lens according to the present disclosure has excellent optical performance due to less decentering error, maintains excellent dimensional accuracy of the lens diameter, and suppresses occurrence of noise such as flare or ghost.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiment 1)

Figure 1:
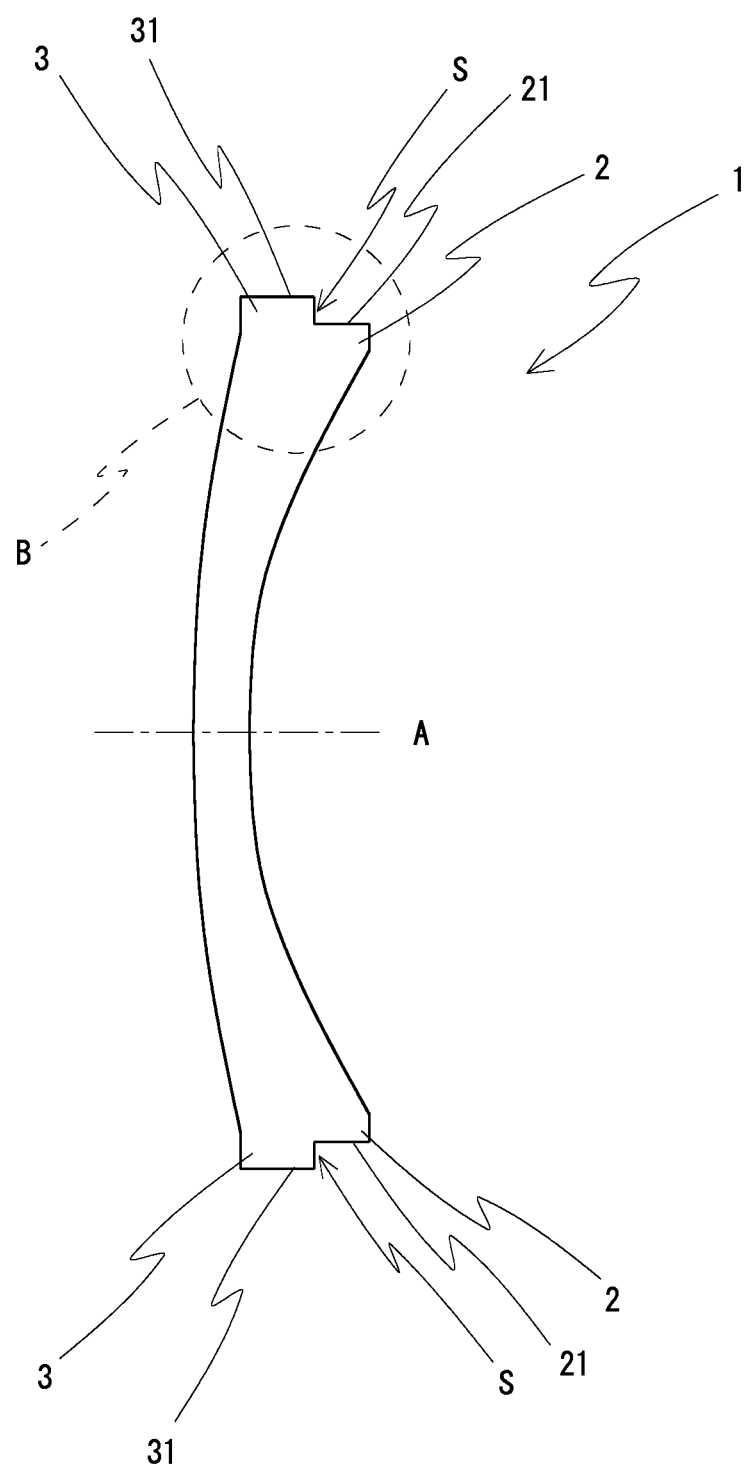
FIG. 1 is a schematic cross-sectional view of a plastic lens according to Embodiment 1 along a direction parallel to an optical axis.

FIG. 1 is a schematic cross-sectional view of a plastic lens according to Embodiment 1 along a direction parallel to an optical axis.

The plastic lens 1 according to Embodiment 1 is a concave meniscus lens. In FIG. 1, the plastic lens 1 includes a first edge section 2 on a concave surface side, and a second edge section 3 on a convex surface side. The first edge section 2 has a first outer circumferential edge surface 21, and the second edge section 3 has a second outer circumferential edge surface 31. The first outer circumferential edge surface 21 is formed substantially parallel to an optical axis A of the lens. The second outer circumferential edge surface 31 is formed so as to have an outer circumferential step S with respect to the first outer circumferential edge surface 21 in the direction of the optical axis A of the lens. In this way, in the plastic lens 1 according to Embodiment 1, in contrast to conventional plastic lenses each having a tapered portion, a step structure is formed by the first edge section 2 and the second edge section 3.

Further, in the plastic lens 1 according to Embodiment 1, at least a portion of the second outer circumferential edge surface 31 is coated with a black coating material for suppressing internal reflection of incident light. Thus, not the entirety of the outer circumferential edge surface of the lens but at least a portion of the second outer circumferential edge surface 31 is coated with the black coating material. Therefore, internal reflection of light incident on the convex surface of the lens can be suppressed. Further, the step structure is formed by the first edge section 2 and the second edge section 3. Therefore, in the first edge section 2 that is not coated with the black coating material, the dimensional accuracy of the lens diameter can be maintained.

Therefore, the plastic lens 1 according to Embodiment 1 has excellent optical performance due to less decentering error, maintains excellent dimensional accuracy of the lens diameter, and suppresses internal reflection of incident light. Therefore, when the plastic lens 1 is used as a component of an imaging optical system such as a zoom lens system or a single focal length lens system, decentering error can be reduced by holding the first edge section 2 having less dimensional error of the lens diameter, and thus an imaging optical system having excellent optical performance can be provided. Further, the plastic lens 1 is excellent in appearance, and is particularly suitable as a front lens constituting the imaging optical system. Further, the plastic lens 1 can be easily produced, and has excellent mass productivity.

Figure 2:
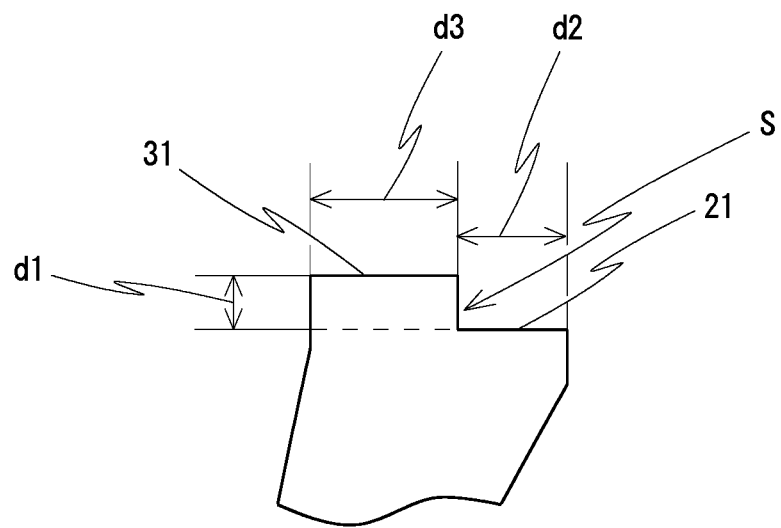
FIG. 2 is a schematic enlarged view of a part B of the plastic lens shown in FIG. 1.

FIG. 2 is a schematic enlarged view of a part B, enclosed by a broken line, of the plastic lens 1 shown in FIG. 1. In FIG. 2, d1 represents the size of a step S between the first outer circumferential edge surface 21 and the second outer circumferential edge surface 31, d2 represents a shortest linear distance between both ends of the first outer circumferential edge surface 21 (the thickness of the plastic lens 1 at the outermost end of the first edge section 2), and d3 represents a shortest linear distance between both ends of the second outer circumferential edge surface 31 (the thickness of the plastic lens 1 at the outermost end of the second edge section 3).

In the plastic lens 1 according to Embodiment 1, a distance between the second edge section 3 and the optical axis A of the lens is longer than a distance between the first edge section 2 and the optical axis A of the lens. The second outer circumferential edge surface 31 of such the second edge section 3 is coated with the black coating material, and it is beneficial that such a plastic lens satisfies the following condition (1):

$$0.1 < D2 - D1 < 2.0 \tag{1}$$

where $D1$ is a diameter (mm) of the plastic lens at the first edge section, and $D2$ is a diameter (mm) of the plastic lens at the second edge section.

The condition (1) sets forth a difference between the diameter at the second edge section 3 and the diameter at the first edge section 2, that is, a length twice the size d1 of the step S. When the value goes below the lower limit of the condition (1), if the black coating material applied to the second outer circumferential edge surface 31 excessively protrudes on the first outer circumferential edge surface 21, decentering error of the resultant plastic lens 1 is increased, which might cause a reduction in the optical performance. When the value exceeds the upper limit of the condition (1), the outer diameter of the plastic lens 1 becomes excessively large, which makes it difficult to realize a compact imaging optical system including the plastic lens 1.

In Embodiment 1, when at least one of the following conditions (1-1)' and (1-1)" is satisfied, application of the black coating material is facilitated, and thereby workability is enhanced (in conditions (1-1)' and (1-1)", the unit is mm).

$$0.4 < D2 - D1 \tag{1-1)'}$$

$$D2 - D1 < 1.5 \tag{1-1)''}$$

Further, when at least one of the following conditions (1-2)' and (1-2)" is satisfied, the degree of freedom in the method of applying the black coating material is further increased, and thereby excellent mass productivity is realized (in conditions (1-2)' and (1-2)", the unit is mm).

$$0.8 < D2 - D1 \tag{1-2)'}$$

$$D2 - D1 < 1.1 \tag{1-2)''}$$

Although the plastic lens 1 according to Embodiment 1 has such a lens shape that the diameter at the second edge section 3 is larger than the diameter at the first edge section 2, the diameter at the first edge section 2 may be larger than the diameter at the second edge section 3. However, in terms of the workability in the application process, it is beneficial that the black coating material is applied to the outer circumferential edge surface of the edge section having the larger diameter. Further, although in Embodiment 1 the black coating material is applied to the second outer circumferential edge surface 31, the black coating material may be applied to the first outer circumferential edge surface 21. However, it is beneficial to apply the black coating material to the convex surface side, that is, the second outer circumferential edge surface 31 opposite to the concave surface side, because, in this case, internal reflection of light incident on the convex surface side can be suppressed more successfully. As described above, in the plastic lens 1 according to Embodiment 1, the second outer circumferential edge surface 31 on the convex surface side is coated with the black coating material, and therefore, it is possible to suppress occurrence of noise such as flare or ghost while enhancing the workability.

The shortest linear distance d2 between the both ends of the first outer circumferential edge surface 21 and the shortest linear distance d3 between the both ends of the second outer circumferential edge surface 31 vary depending on, for example, the shape of the intended plastic lens 1, and therefore, are not specifically limited. For example, when the plastic lens 1 has a concave meniscus shape as shown in FIG. 1, d2 is about 1.0 to 2.5 mm, and d3 is about 1.2 to 3.0 mm. It is beneficial that d2 is 0.3 mm or larger in terms of design. Thus, in Embodiment 1, d3 larger than d2 (d2<d3) is beneficial for further suppression of occurrence of noises such as flare and ghost.

The black coating material used in Embodiment 1 is a coating material whose viscosity is higher than that of a low-viscosity coating material such as ink ("sumi" in Japanese) to be applied to a lens made of a glass material, and therefore, is applicable to a plastic lens.

It is beneficial to adopt, as the black coating material, a black oily ink containing a solvent such as alcohol as a main component, a black colorant, a resin, a curing agent, a plasticizer, and the like. The black oily ink can be applied to the plastic lens by using a brush or a marking pen. Use of the marking pen is beneficial in terms of working efficiency, and less likelihood of occurrence of uneven coating such as excess/shortage of a coating range or an uneven thickness of a resultant coating layer.

Examples of a marking pen used for application of the black coating material are: Magic Ink (black, manufactured by Teranishi Chemical Industry Co., Ltd., registered trademark of UCHIDA YOKO CO., LTD.); PAINT MARKER (black, manufactured by Mitsubishi Pencil Co., Ltd., trade name); Artline Kawakimapen (black, manufactured by Shachihata Inc., trade name, Artline is registered trademark); and the like.

Figure 3:
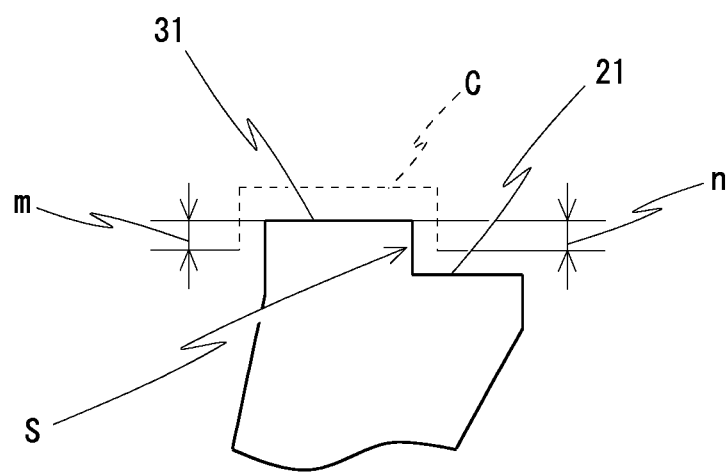
FIG. 3 is a schematic enlarged view of the part B of the plastic lens shown in FIG. 1.

FIG. 3 is a schematic enlarged view of a part B, enclosed by a broken line, of the plastic lens 1 shown in FIG. 1, illustrating an example of a coating range of the black coating material.

In FIG. 3, a range indicated by a broken line C is a coating range where the black coating material is applied on the second outer circumferential edge surface 31. In Embodiment 1, the black coating material is applied so as to cover the entire second outer circumferential edge surface 31. Although it is beneficial to apply the black coating material so as to cover the entire second outer circumferential edge surface 31 in terms of the effect of suppressing internal reflection of incident light, the black coating material may be applied to a portion of the second outer circumferential edge surface 31 as long as internal reflection can be suppressed.

Further, in the plastic lens in which the entire second outer circumferential edge surface 31 is coated with the black coating material, actually, the black coating material may slightly protrude from the second outer circumferential edge surface 31 as shown in FIG. 3. In FIG. 3, m and n each indicate the length of a protruding portion of the black coating material from the second outer circumferential edge surface 31. For example, in the case of the plastic lens 1 satisfying the condition (1), it is beneficial that m and n are each about half the size d1 or less, that is, about 0.02 to 0.40 mm.

As described above, in the plastic lens 1 according to Embodiment 1, in contrast to the conventional plastic lens having a taper, a step structure is formed by the first edge section 2 and the second edge section 3, and at least a portion of the second outer circumferential edge surface 31 of the second edge section 3 is coated with the black coating material for suppressing internal reflection of incident light. Accordingly, the plastic lens 1 according to Embodiment 1 has excellent evenness of the thickness of the coating layer, less protruding portion of the black coating material, excellent optical performance due to less decentering error, and excellent dimensional accuracy of the lens diameter being maintained.

Figure 4:
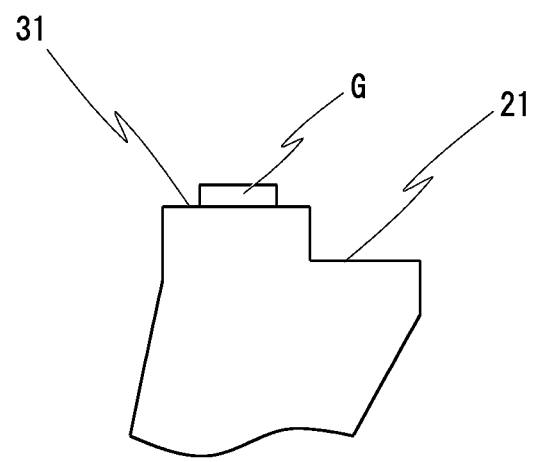
FIG. 4 is a schematic enlarged view of the part B of the plastic lens shown in FIG. 1.

FIG. 4 is a schematic enlarged view of a part B, enclosed by a broken line, of the plastic lens 1 shown in FIG. 1. In FIG. 4, G indicates a gate trace.

A plastic lens used as an optical element is usually formed by injection molding, and it is beneficial that the plastic lens 1 according to Embodiment 1 is formed by injection molding.

The injection molding is a molding method having steps: injecting a lens material containing a resin, which has been melted by heating and appropriately temperature-controlled, into a mold having an intended lens shape, at an injection speed and an injection pressure set according to the lens material; holding the lens material in the mold at appropriate mold temperature and pressure; and solidifying the lens material by cooling to obtain a desired plastic lens. In the injection molding, the lens material is injected from a gate section of the mold. Then, the lens material in the gate section is also solidified by the cooling. When the plastic lens is taken out from the mold being opened, the plastic lens has a gate trace caused by the lens material solidified in the gate section.

If the plastic lens having the gate trace remained is used particularly as a front lens in an imaging optical system, the gate trace is visible from the front surface of the imaging optical system, and might deteriorate the appearance of the imaging optical system. Therefore, when the second outer circumferential edge surface 31 is coated with the black coating material as in the plastic lens 1 according to Embodiment 1, it is beneficial that the second outer circumferential edge surface 31 has a gate trace G as shown in FIG. 4.

Further, when the plastic lens is used particularly as a front lens in an imaging optical system, it is beneficial to use at least one plastic lens having a concave surface in terms of compensation of aberration. However, an edge section of the front lens is visible from the front surface of the imaging optical system, and might deteriorate the appearance of the imaging optical system.

The plastic lens 1 according to Embodiment 1 has a concave second surface (an image side surface when arranged in an imaging optical system), and therefore, is suitable as a front lens in the imaging optical system. Moreover, in the plastic lens 1, since the second outer circumferential edge surface 31 is coated with the black coating material, internal reflection of light incident on the convex surface side can be suppressed, and the first edge section 2 and the second edge section 3 are less likely to be visible from the front surface of the imaging optical system, which provides excellent appearance.

Figure 5:
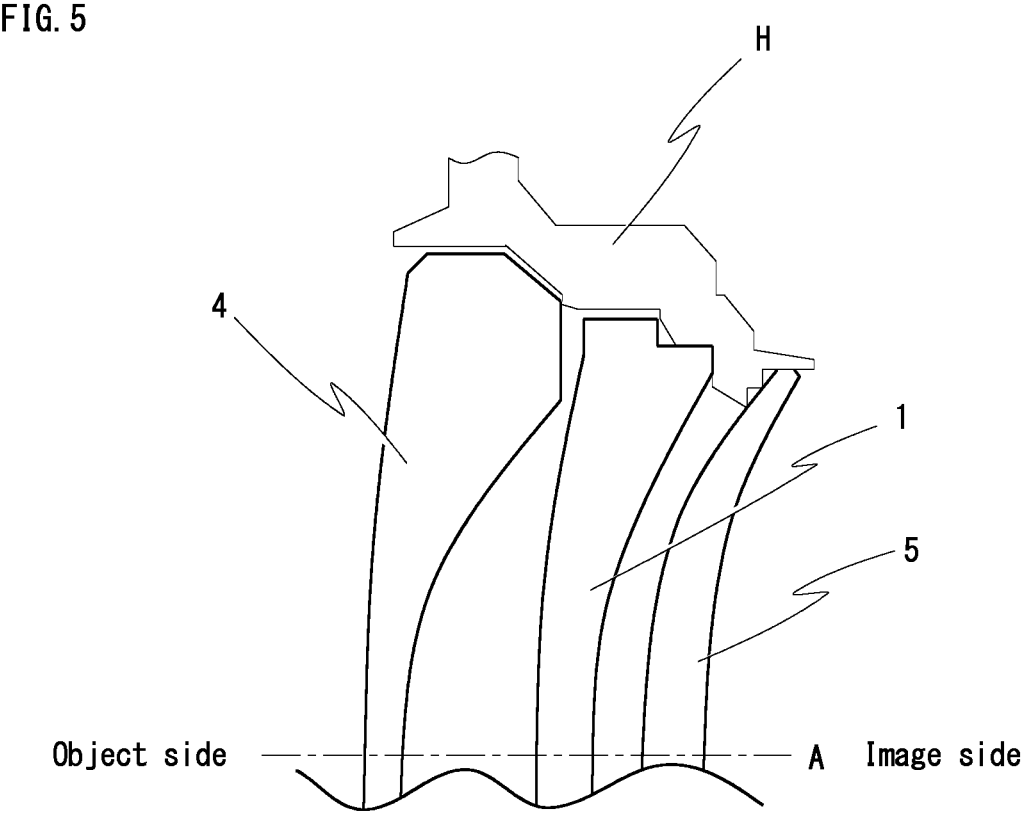
FIG. 5 is a schematic cross-sectional view of a part of a lens barrel holding the plastic lens shown in FIG. 1.

FIG. 5 is a schematic cross-sectional view of a part of a lens barrel holding the plastic lens 1 according to Embodiment 1. The lens barrel includes, from the object side to the image side, a lens 4, the plastic lens 1, and a lens 5. These lenses are held by a holding section H of the lens barrel. The plastic lens 1 is held at the first edge section 2 having less dimensional error of the lens diameter. Since the lens barrel holds the plastic lens 1 at the first edge section 2, the decentering error is reduced, and the optical performance is enhanced. Further, since at least a portion of the second outer circumferential edge surface 31 is coated with the black coating material, internal reflection of incident light is suppressed, and thereby occurrence of noise such as flare or ghost is suppressed. Further, when the plastic lens 1 according to Embodiment 1 is arranged as a front lens in an imaging optical system, the edge sections are less likely to be visible, thereby providing a lens barrel whose appearance from the front surface of the imaging optical system is excellent.

(Other Embodiments)

As described above, Embodiment 1 has been described as an example of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

In Embodiment 1, the plastic lens 1 as a concave meniscus lens having the concave-surface-side first edge section 2 and the convex-surface-side second edge section 3 has been described as an example. However, the plastic lens according to the present disclosure is not limited to such a concave meniscus lens, and any plastic lens may be adopted as long as the plastic lens includes the first edge section having the first outer circumferential edge surface formed substantially parallel to the optical axis of the lens, and the second edge section having the second outer circumferential edge surface formed so as to have a step with respect to the first outer circumferential edge surface, the first outer circumferential edge surface is not coated with the black coating material for suppressing internal reflection of light, and at least a portion of the second outer circumferential edge surface is coated with the black coating material for suppressing internal reflection of light. For example, a convex meniscus lens, a bi-concave lens, a plano-concave lens, and the like can be exemplified as the plastic lens according to the present disclosure. Since the convex meniscus lens, the bi-concave lens, and the plano-concave lens each have at least one concave surface like the concave meniscus lens, it is beneficial that any of these lenses is arranged particularly as a front lens in an imaging optical system, in terms of compensation of aberration. For example, a convex meniscus lens having a concave second surface (an image side surface of the imaging optical system), a bi-concave lens, a plano-concave lens having a concave second surface, or the like can suppress internal reflection of light incident on the convex surface side, and is excellent in appearance because an edge section thereof is less likely to be visible from the front surface of the imaging optical system, like the plastic lens 1, that is a concave meniscus lens having a concave second surface, shown in FIG. 1. Therefore, these lenses are beneficial examples of the plastic lens according to the present disclosure.

The present disclosure is applicable as a lens constituting an imaging optical system such as a zoom lens system or a single focal length lens system. In particular, the present disclosure is suitable as a front lens constituting the imaging optical system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A plastic lens comprising:
two lens surfaces, the two lens surfaces including a first surface and a second surface that opposes the first surface;
a first edge section having a first outer circumferential edge surface formed substantially parallel to an optical axis of the plastic lens; and
a second edge section having a second outer circumferential edge surface that is formed so as to have a step with respect to the first outer circumferential edge surface, and that is formed substantially parallel to the optical axis of the plastic lens, wherein
the first edge section and the second edge section are located outside of a longer lens surface among the two lens surfaces in a radial direction from the optical axis of the plastic lens,
the first outer circumferential edge surface is not coated with a black coating material that suppresses internal reflection of light,
at least a portion of the second outer circumferential edge surface is coated with the black coating material that suppresses internal reflection of light,
the first edge section is held by a holding section,
the second edge section is not held by the holding section, and
the plastic lens satisfies the following condition (1):

$$0.1 < D2 - D1 < 2.0 \quad (1)$$

where
D1 is a diameter (mm) of the plastic lens at the first edge section, and
D2 is a diameter (mm) of the plastic lens at the second edge section.

2. The plastic lens as claimed in claim 1, wherein
a surface opposite to a light-incident side is a concave surface, and
the second outer circumferential edge surface is formed at a position closer to the light-incident side than the first outer circumferential edge surface.

3. The plastic lens as claimed in claim 1,
being formed by injection molding, and
having, on the second outer circumferential edge surface, a gate trace that has been formed when a lens material injected into a mold from a gate section at the time of the injection molding was solidified in the gate section.

4. A lens barrel, comprising:
a plastic lens; and
a holding section that holds at least the plastic lens, wherein
the plastic lens comprises:
two lens surfaces, the two lens surfaces including a first surface and a second surface that opposes the first surface;
a first edge section having a first outer circumferential edge surface formed substantially parallel to an optical axis of the plastic lens; and a second edge section having a second outer circumferential edge surface that is formed so as to have a step with respect to the first outer circumferential edge surface, and that is formed substantially parallel to the optical axis of the plastic lens, wherein the first edge section and the second edge section are located outside of a longer lens surface among the two lens surfaces in a radial direction from the optical axis of the plastic lens, the first outer circumferential edge surface is not coated with a black coating material that suppresses internal reflection of light, at least a portion of the second outer circumferential edge surface is coated with the black coating material that suppresses internal reflection of light, the plastic lens is held by the holding section at the first edge section, the plastic lens is not held by the holding section at the second edge section, and the plastic lens satisfies the following condition (1):

$$0.1 < D2 - D1 < 2.0 \qquad (1)$$

where

D1 is a diameter (mm) of the plastic lens at the first edge section, and

D2 is a diameter (mm) of the plastic lens at the second edge section.

5. The lens barrel as claimed in claim 4, comprising, in order from an object side to an image side, at least a lens and the plastic lens, wherein the lens is held by the holding section.

* * * * *